US010467243B2

(12) United States Patent
Liu et al.

(10) Patent No.: US 10,467,243 B2
(45) Date of Patent: Nov. 5, 2019

(54) EFFICIENT IN-MEMORY DB QUERY PROCESSING OVER ANY SEMI-STRUCTURED DATA FORMATS

(71) Applicant: Oracle International Corporation, Redwood Shores, CA (US)

(72) Inventors: Zhen Hua Liu, San Mateo, CA (US); Shasank Kisan Chavan, Menlo Park, CA (US); Aurosish Mishra, Belmont, CA (US)

(73) Assignee: Oracle International Corporation, Redwood Shore, CA (US)

( * ) Notice: Subject to any disclaimer, the term of this patent is extended or adjusted under 35 U.S.C. 154(b) by 129 days.

(21) Appl. No.: 15/162,235

(22) Filed: May 23, 2016

(65) Prior Publication Data
US 2017/0060973 A1   Mar. 2, 2017

Related U.S. Application Data

(63) Continuation-in-part of application No. 14/836,680, filed on Aug. 26, 2015, now Pat. No. 10,262,012.
(Continued)

(51) Int. Cl.
*G06F 17/30* (2006.01)
*G06F 7/00* (2006.01)
(Continued)

(52) U.S. Cl.
CPC .......... *G06F 16/258* (2019.01); *G06F 16/215* (2019.01); *G06F 16/2246* (2019.01);
(Continued)

(58) Field of Classification Search
CPC .......... G06F 17/30569; G06F 17/3092; G06F 17/30327; G06F 17/3065; G06F 17/3033;
(Continued)

(56) References Cited

U.S. PATENT DOCUMENTS 7,644,014 B2 * 1/2010 Viswanath .......... G06Q 10/087
                                                    379/93.12
7,877,400 B1    1/2011 Matthew
(Continued)

FOREIGN PATENT DOCUMENTS

WO    WO 03/107222 A1    12/2003
WO    WO 2015/041967 A1    3/2015
WO    WO 2015/069941      5/2015

OTHER PUBLICATIONS

Roth et al., "Don't' Scrap It Wrap it!, A Wrapper Architecture for Legacy Data Sources", Proceedings of the International Conference on Very Largedata Bases, dated Aug. 26, 1997, 10 pages.
(Continued)

*Primary Examiner* — Kuen S Lu
(74) *Attorney, Agent, or Firm* — Hickman Palermo Becker Bingham LLP

(57) ABSTRACT

Techniques are described herein for maintaining two copies of the same semi-structured data, where each copy is organized in a different format. One copy is in a first-format that may be convenient for storage, but inefficient for query processing. For example, the first-format may be a textual format that needs to be parsed every time a query needs to access individual data items within a semi-structured object. The database system intelligently loads semi-structured first-format data into volatile memory and, while doing so, converts the semi-structured first-format data to a second-format. Because the data in volatile memory is in the second-format, processing queries against the second-format data both allows disk I/O to be avoided, and increases the efficiency of the queries themselves. For example, the parsing that may be necessary to run a query against a cached copy of the first-format data is avoided.

36 Claims, 11 Drawing Sheets

Related U.S. Application Data

(60) Provisional application No. 62/245,976, filed on Oct. 23, 2015.

(51) Int. Cl.

| | | |
|---|---|---|
| *G06F 16/25* | (2019.01) | |
| *G06F 16/84* | (2019.01) | |
| *G06F 16/22* | (2019.01) | |
| *G06F 16/33* | (2019.01) | |
| *G06F 16/28* | (2019.01) | |
| *G06F 16/215* | (2019.01) | |

(52) U.S. Cl.
CPC ........ *G06F 16/2255* (2019.01); *G06F 16/282* (2019.01); *G06F 16/3331* (2019.01); *G06F 16/86* (2019.01); *G06F 16/88* (2019.01)

(58) Field of Classification Search
CPC ......... G06F 17/30917; G06F 17/30303; G06F 16/282; G06F 16/86; G06F 16/2255; G06F 16/3331; G06F 16/258; G06F 16/88; G06F 16/2246; G06F 16/215
USPC ........................................................ 707/692
See application file for complete search history.

(56) References Cited

U.S. PATENT DOCUMENTS

| | | | |
|---|---|---|---|
| 8,578,261 B1 * | 11/2013 | Gupta | G06F 17/30899 715/205 |
| 9,251,210 B2 | 2/2016 | Chaudhry et al. | |
| 9,659,045 B2 | 5/2017 | Liu et al. | |
| 9,916,352 B2 | 3/2018 | Chaudhry et al. | |
| 2005/0044089 A1 * | 2/2005 | Wu | G06F 17/30067 |
| 2007/0255748 A1 * | 11/2007 | Ferragina | G06F 17/30961 |
| 2008/0065596 A1 * | 3/2008 | Shadmon | G06F 17/30911 |
| 2009/0063538 A1 * | 3/2009 | Chitrapura | G06F 17/30887 |
| 2009/0307241 A1 | 12/2009 | Schimurtek et al. | |
| 2010/0325169 A1 * | 12/2010 | Loh | G06F 17/30911 707/803 |
| 2011/0113036 A1 | 5/2011 | Idicula et al. | |
| 2012/0036133 A1 | 2/2012 | Chen et al. | |
| 2014/0032615 A1 | 1/2014 | Hammerschmidt et al. | |
| 2016/0147833 A1 | 5/2016 | Chaudhry et al. | |
| 2016/0294651 A1 * | 10/2016 | Renna | H04L 43/06 |
| 2017/0060912 A1 | 3/2017 | Liu et al. | |
| 2019/0102412 A1 | 4/2019 | Macnicol et al. | |

OTHER PUBLICATIONS

Candillier et al., "Mining XML Documents" In: Data Mining Patterns: New Methods and Applications, dated Nov. 19, 2007, IGI Global, 28 pages.

Anonymous: "Oracle Database In-Memory: Powering the Real-Time Enterprise", dated Dec. 31, 2014, 9 pages.

Abello et al. "Data Warehousing, Handbook of Massive Datasets", dated Apr. 1, 2002, Springer, 4 pages.

Wikipedia, the free encyclopedia, "Protocol Buffers", last viewed on Dec. 28, 2015, https://en.wikipedia.org/wiki/Protocol_Buffers, 3 pages.

Wikipedia, the free encyclopedia, "BSON", last viewed on Dec. 28, 2015, https://en.wikipedia.org/wiki/BSON, 3 pages.

Wikipedia, the free encyclopedia, "Apache Avro", https://en.wikipedia.org/wiki/Apache_Avro, last viewed on Dec. 28, 2015, 2 pages.

Liu, U.S. Appl. No. 14/836,680, filed Aug. 26, 2015, Office Action, dated Apr. 18, 2018.

KD Nuggets, "Apache Arrow and Apache Parquet: Why We Needed Different Projects for Columnar Data, on Disk and In-Memory", www.kdnuggets.com/2017/02/apache-arrow-parquet-columnar-data, Feb. 2017, 8pgs.

* cited by examiner

FIG. 1

```
{
  "person" : {
    "id" : '123',
    "name" : 'john',
    "birthdate" : '1970-01-02',
    "friends" : [
      {
        "person" : {
          "id" : '456',
          "name" : 'Mary',
          "birthdate" : '1968-04-03'
        }
      },
      {
        "person" : {
          "id" : '789',
          "name" : 'Henry',
          "birthdate" : '1972-03-03'
        }
      }
    ],
    "location" : {
      "city" : 'Oakland',
      "zip" : '94403'
    }
  }
}
```

HIERARCHICAL DATA OBJECT 100

Data Guide 501

| PID | PATH | DATATYPE | MIN | MAX |
|---|---|---|---|---|
| 1 | FIRSTNAME | STRING | 4 | 7 |
| 2 | LASTNAME | STRING | 5 | 15 |
| 3 | BORN | {} | | |
| 4 | BORN.CITY | STRING | 8 | 9 |
| 5 | BORN.STATE | STRING | 2 | 2 |
| 6 | BORN.DATE | DATE | 11/08/82 | 09/10/95 |

JSON Object J
{
"FIRSTNAME": "JACK",
"LASTNAME": "SMITH",
"BORN": {

"CITY": "SAN JOSE",
"STATE": "CA",
"DATE": "11/08/82"
},
}

JSON Object K
{
"FIRSTNAME": "TIMOTHY",
"LASTNAME": "JOHNSON-LINCOLN",
"BORN": {

"CITY": "SAN DIEGO",
"STATE": "CA",
"DATE": "09/10/95"
},
}

FIG. 5

```
{
    "_id" : "TILL-120613-0959-5124-100-2005-771",
        "StoreTransaction" : {
            "StoreNo" : 5124,
            "PosNo" : 100,
            "CashierNo" : 2005,
            "TicketNo" : 771,
            "EndDateTime" : ISODate("2013-06-
12T08:59:50Z")
        },
        "LineItems" : [
            {
                "Identity" : {
                    "Code" : "529"
                },
                "Amount" : 200,
                "CancelledAmount" : 0,
                "Units" : {
                    "Quantity" : 1,
                    "CancelledQuantity" : 0,
                    "Price" : 200,
                    "Measure" : "E"
                }
            }
            {
                "Identity" : {
                    "Code" : "369"
                },
                "Amount" : 600,
                "CancelledAmount" : 0,
                "Units" : {
                    "Quantity" : 6,
                    "CancelledQuantity" : 0,
                    "Price" : 100,
                    "Measure" : "E"
                }
            }
        ],
        "Totals" : {
            "TicketAmount" : 800,
            "CashReturned" : 200,
            "SavingsFromPromotions" : 0,
            "SubTotalBeforePromotions" : 800
        },
        "Tenders" : {
            "Cash" : {
                "Amount" : 1000,
                "Change" : -200
            },
            "Cards" : [ ]
        },
        "Discounts" : {

},
        "CountryCode" : "GBR",
        "Currency" : "£"
}
```

FIG. 6

Object V

DATA GUIDE 701

| PID | Path | DATATYPE |
|---|---|---|
| 1 | _id | STRING |
| 2 | StoreTransaction | {} |
| 3 | StoreTransaction.StoreNo | NUMBER |
| 4 | StoreTransaction.PosNo | NUMBER |
| 5 | StoreTransaction.TicketNo | NUMBER |
| 6 | StoreTransaction.EndDateTime | DATE |
| 7 | LineItems | [] |
| 8 | LineItems.Identities | {} |
| 9 | LineItems.Identities.Code | NUMBER |
| 10 | LineItems.Amount | NUMBER |
| 11 | LineItems.CancelledAmount | NUMBER |
| .... | | |

FIG. 7

View SCALAR-VIEW "Generated by invoking JSON_RelationViewGenerator ('scalar-view', '*')"

Create view scalar-view AS
Select j1.id, j1.StoreNo, j1.PosNo, j1.TicketNo, j1.EndDateTime
From jtab , JSON_TABLE(jtab.jcol, '$._id'
        Columns
           Id varchar(40) path '$._id',
           StoreNo number path '$.StoreTransaction.StoreNo',
           PosNo number path '$.StoreTransaction.PosNo',
           TicketNo number path '$.StoreTransaction.TicketNo',
           EndDateTime number path '$.StoreTransaction.EndDateTime') j1

View SELECTED-SCALAR-VIEW "Generated by invoking JSON_RelationViewGenerator ('selected-scalar-view', '1,3")"

Create view selected-scaler-view AS
Select j1.id, j1.StoreNo, j1.PosNo, j1.TicketNo, j1.EndDateTime
From jtab , JSON_TABLE(jtab.jcol, '$._id'
        Columns
           Id number path varchar(40) path '$._id',
           StoreNo number path '$.StoreTransaction.StoreNo') j1

View ARRAY-VIEW "Generated by invoking JSON_RelationViewGenerator ('array-scalar-view', '1,9-11')"

Create view array-view AS
Select j1.id, j2.code, j2.amount, j2.cancelledamount
From jtab , JSON_TABLE(jtab.jcol, '$._id'
        Columns
           Id varchar(40) path '$._id',
           lineItem format json path '$.lineItems') j1,
        JSON_TABLE(j1.lineItem, '$[*]'
        Columns
          Code number path '$.Identities.Code',
          Amount number path '$.Amount',
          Cancelledamount number path 'cancelledamount') j2

FIG. 8

EFFICIENT IN-MEMORY DB QUERY PROCESSING OVER ANY SEMI-STRUCTURED DATA FORMATS

CROSS-REFERENCE TO RELATED APPLICATIONS; BENEFIT CLAIM

This application claims the benefit of Provisional Appln. 62/245,976, filed Oct. 23, 2015, the entire contents of which is hereby incorporated by reference as if fully set forth herein, under 35 U.S.C. § 119(e). This application also claims benefit as a continuation-in-part of U.S. patent application Ser. No. 14/836,680, filed Aug. 26, 2015, (the "OSON Application") the entire contents of which is hereby incorporated by reference as if fully set forth herein.

FIELD OF THE INVENTION

The present invention relates to managing access to semi-structured data and, more specifically, to storing semi-structured data in memory in a mirror-format that is independent of the format in which the semi-structured data resides in on disk.

BACKGROUND

Within relational database systems, data tends to be organized in a highly structured manner. Specifically, data is often stored in relational tables, where each row represents a set of related data (e.g. information about a particular person), and each column corresponds to a particular attribute (e.g. name, address, age, etc.). However, using relational tables to store and access data that has less structure is less straightforward.

It is becoming increasingly important to be able to store and efficiently access data that is less structured (referred to as "semi-structured data"). Semi-structured data, such as XML, JSON etc. are the primary data model to support schema-less development paradigm where users do not have to specify schema in order to store data and query data.

Because a schema is not required ahead of time to store semi-structured data, users have freedom to store whatever original forms of the semi-structured data on disk. Unfortunately, this freedom comes at the price of performance. Query performance over the semi-structured data is reduced because some of the original forms of the semi-structure data are very inefficient for query processing. For example, storing textual format of XML or JSON on disk is simple and convenient for users, but very inefficient to answer queries over textual storage due to the expense of text parsing.

An example of a semi-structured document is illustrated in FIG. 1. Referring to FIG. 1, the depicted semi-structured hierarchical data object 100 is a JSON document. While JSON is used as an example of semi-structured data, the techniques described herein are applicable to any form of semi-structured data. In FIG. 1, a JSON object may be represented by data that is enclosed by the curly braces "{"and"}". Thus, a JSON object may be a person and/or a location described in FIG. 1.

Hierarchical data object 100 may include field-names that are associated with field values. In the example of FIG. 1, the field-names include "person", "id", "birthdate", "friends", "location", "city", and "zip". For JSON objects, field-names may precede a colon in a name-value pair. In the example of FIG. 1, the field values include '123', 'john', '1970-01-02', '456', 'Mary', '1968-04-03', '789', 'Henry', '1972-03-03', 'Oakland', and '94403'. For JSON objects, field values may be anything other than a field-name or a grouping symbol that follows a colon in a name-value pair. Field values may include a null value, a Boolean value, a string value, a number value, a float value, a double precision value, a date value, a timestamp value, a timestamp with a time zone value, a year-month interval, a day-second interval, a signed binary integer, and/or any other data type. Each field-name may be associated with one or more field values in hierarchical data object 100. For example, "person" may be associated with '456', 'Mary', and '1968-04-03'.

Caching semi-structured data in volatile memory yields some query performance improvement because the need to access persistent storage during query processing is reduced. For example, if the text of object 100 is loaded into volatile memory before receiving a query that targets object 100, then the query can execute faster simply because no additional disk I/Os are necessary. However, since what is pre-loaded into volatile memory still reflects the original storage form of the semi-structured data, query performance still suffers due to the need to parse or otherwise process the semi-structured data during query execution.

One approach to address the query processing inefficiencies that results from the format of the semi-structured data is to convert the semi-structured data into another format prior to storing the semi-structured data in the database. For example, various database system vendors have developed proprietary binary formats to use to store semi-structure data within their respective database systems. For example, Oracle, IBM, and Microsoft SQL server have required users to store XML data as XMLType, which internally translates the XML into a vendor specific binary format for vendor-specific efficient query processing over that format. Similarly, MongoDB requires users to store JSON data as BSON for efficient JSON query processing.

While the strategy of converting the semi-structured data into a new format works for semi-structured data that is to be stored inside the database and fully controlled by the corresponding database system, for data stored in external file system and mounted to database as external table, the database-specific binary storage format strategy does not work. Specifically, under these circumstances, the database system has no control of the data stored outside the database. The database system cannot pro-actively convert the data to a database-specific binary storage format because that would render the data unusable by whatever other external systems need to access the data.

Based on the foregoing, it is clearly desirable to have a technique to speed up query processing, by a database system, over semi-structured data whose primary storage format may not be fully controllable by the database system, particularly when the primary storage format is not efficient for query processing.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 depicts an example semi-structured hierarchical data object;

FIG. 5 is a block diagram of data guide that may be generated for a set of hierarchical objects, according to one embodiment;

FIG. 6 is an example hierarchical object;

FIG. 7 is an example data guide generated according to one embodiment;

FIG. 8 illustrates view definitions that may be generated based on a data guide, according to an embodiment;

DETAILED DESCRIPTION

Figure 2:
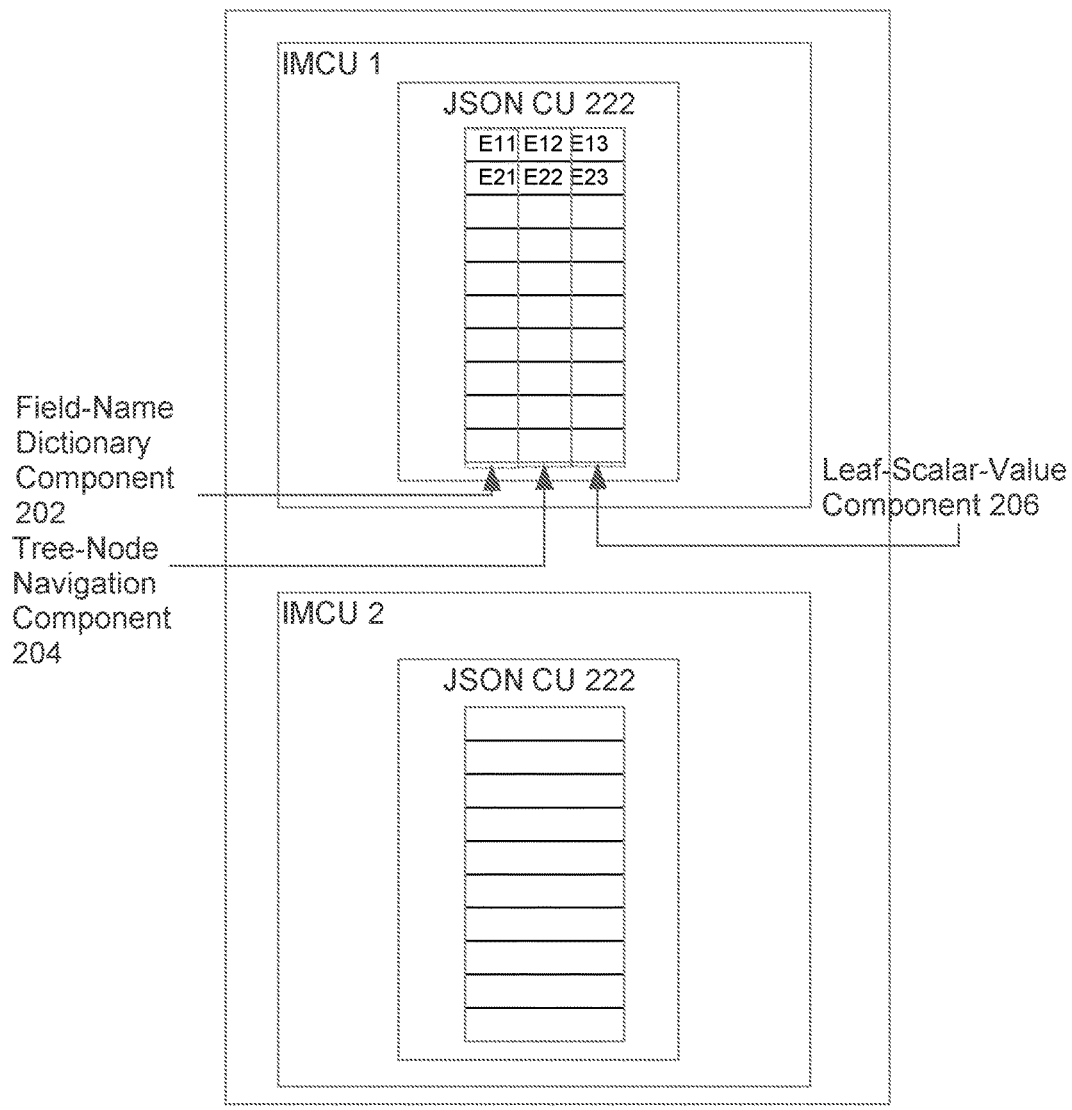
FIG. 2 is a block diagram of an in-memory table that includes two In-Memory Compression Units ("IMCUs"), each of which stores a single JSON column unit that contains Field-name-dictionary component, tree-node-navigation component and Leaf-scalar-value components of a set of semi-structured documents, according to one embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for maintaining semi-structured data on persistent storage in one format (persistent-format), and in volatile memory in another format (mirror-format). Data stored in the persistent-format is referred to herein as PF data, while data stored in the in-memory format is referred to herein as MF data. The PF data may be stored within or outside of the database system itself. When stored outside the database system, the format of the PF data may be outside the control of the database system. Frequently, the persistent-format is a format that is convenient for storage, but inefficient for query processing. For example, the persistent-format may be a textual format that needs to be parsed every time a query needs to access individual data items within a semi-structured object.

Copies of the persistent-format data may be cached, in volatile memory, in the persistent-format. However, while its presence in volatile memory will increase query processing speed by avoiding disk access operations, the fact that the cached data is in the persistent-format provides inferior query processing performance than when the data resides in volatile memory in the in-memory format.

Consequently, according to one embodiment, a database system intelligently loads semi-structured PF data into volatile memory and, while doing so, converts the semi-structured PF data to the mirror-format (a form that is more amendable for in-memory query processing). By doing so, database system provides flexibility of evolving the mirror-format for semi-structured data without worrying about on-disk compatibility issues, because the mirror-format is decoupled from the persistent-format. Further, because the data in volatile memory is in the mirror-format, processing queries against the MF data both allows disk I/O to be avoided, and increases the efficiency of the queries themselves. For example, the parsing that may be necessary to run a query against a cached copy of the PF data is avoided.

According to one embodiment, the database system leverages an in-memory database architecture to keep the PF data and the MF data transactionally consistent. Such an in-memory database architecture is described in detail in described in detail in U.S. application Ser. No. 14/337,179 (United States Publication No. 2015-OO88830A1), Mirroring, In Memory, Data From Disk To Improve Query Performance, filed on Jul. 21, 2014 by Jesse Kamp, et al., (the "Mirroring Application"), the entire contents of which are incorporated herein by reference. The Mirror Application describes, among other things, maintaining multiple copies of the same data items, where one copy is maintained persistently on disk, and another copy is maintained in volatile memory. The copy that is maintained in volatile memory is referred to as an "in-memory copy" (IMC). The structure in which the IMCs are stored may be an in-memory compression unit (IMCU).

Examples of Semi-Structured Data

"Semi-structured data" generally refers to a collection of hierarchical data objects, where the hierarchical structure is not necessarily uniform across all objects in the collection. Frequently, hierarchical data objects are data objects that marked by a hierarchical mark-up language. An example of a hierarchical mark-up language is XML. Another example is JSON.

Data structured using a hierarchical mark-up language is composed of nodes. Nodes are delimited by a set of delimiters that mark the nodes, and may be tagged with names, referred to herein as tag names. In general, the syntax of hierarchical mark-up languages specify that tag names are embedded, juxtaposed, or otherwise syntactically associated with delimiters that delimit nodes.

For XML data, a node is delimited by start and end tags that comprise tag names. For example, in the following XML fragment X,

```
<ZIPCODE>
    <CODE>95125</CODE>
    <CITY>SAN JOSE</CITY>
    <STATE>CA</STATE>
</ZIPCODE>
``` the start tag <ZIP CODE> and the end tag </ZIP CODE> delimit a node having the name ZIP CODE.

Figure 4A:
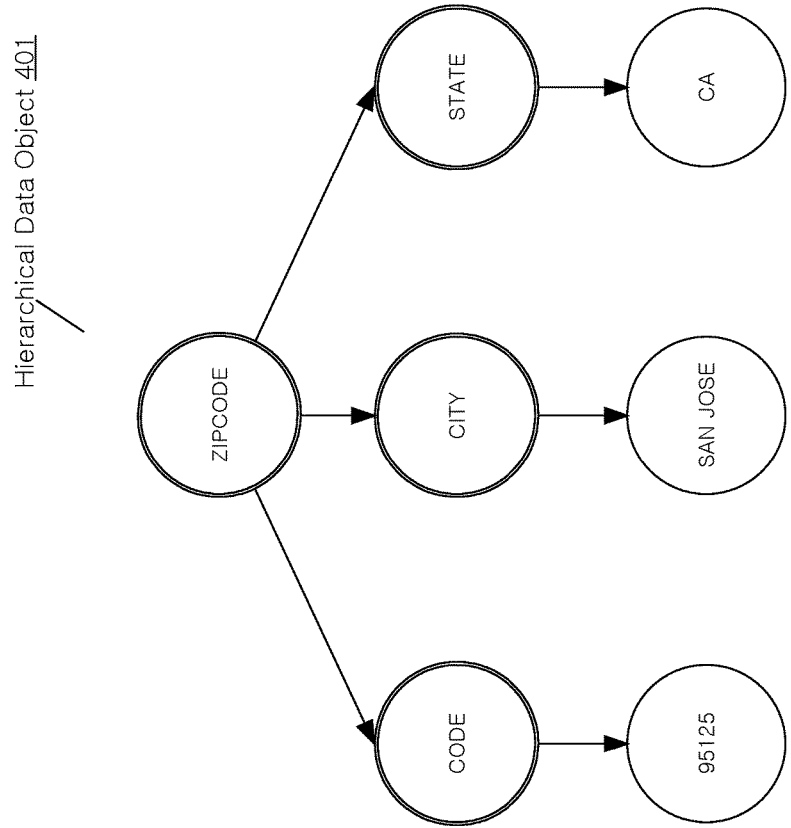
FIG. 4A is a block diagram of an example hierarchical object.

FIG. 4A is a node tree representing the above XML fragment X. Referring to FIG. 4A, it depicts hierarchical data object 401. Non-leaf nodes are depicted with double-line borders, while leaf nodes are depicted with single-line borders. In XML, a non-leaf node corresponds to an element node and a leaf node corresponds to a data node. The element nodes in the node tree are referred to herein by the node's name, which is the name of the element represented by a node. For convenience of exposition, the data nodes are referred to by the value the data nodes represent.

The data between the corresponding tags is referred to as a node's content. For a data node, the content can be a scalar value (e.g. integer, text string, date).

A non-leaf node, such as an element node, contains one or more other nodes. For an element node, the content can be a data node and/or one or more element nodes.

ZIPCODE is an element node that contains child nodes CODE, CITY, and STATE, which are also element nodes. Data nodes 95125, SAN JOSE, and CA are data nodes for element nodes CODE, CITY, and STATE, respectively.

The nodes contained by a particular node are referred to herein as descendant nodes of the particular node. CODE, CITY, and STATE are descendant nodes of ZIPCODE. 95125 is a descendant node of CODE and ZIPCODE, SAN JOSE is a descendant node of CITY and ZIPCODE, and CA is a descendant node of STATE and ZIPCODE.

A non-leaf node thus forms a hierarchy of nodes with multiple levels, the non-leaf node being at the top level. A node at each level is linked to one or more nodes at a different level. Any given node at a level below the top level is a child node of a parent node at the level immediately above the given node. Nodes that have the same parent are sibling nodes. A parent node may have multiple child nodes. A node that has no parent node linked to it is a root node. A node that has no child nodes is a leaf node. A node that has one or more descendant nodes is a non-leaf node.

For example, in container node ZIP CODE, node ZIP CODE is a root node at the top level. Nodes 95125, SAN JOSE, and CA are leaf nodes.

The term "hierarchical data object" is used herein to refer to a sequence of one or more non-leaf nodes, each non-leaf node having a child node. An XML document is an example of a hierarchical data object. Another example is a JSON object.

JSON

JSON is a lightweight hierarchical mark-up language. A JSON object comprises a collection of fields, each of which is a field name/value pair. A field name is in effect a tag name for a node in a JSON object. The name of the field is separated by a colon from the field's value. A JSON value may be:

An object, which is a list of fields enclosed in braces "{ }" and separated within the braces by commas.

An array, which is a list of comma separated JSON nodes and/or values enclosed in square brackets "[ ]".

An atom, which is a string, number, true, false, or null.

The following JSON hierarchical data object J is used to illustrate JSON.

```
{
    "FIRSTNAME": "JACK",
    "LASTNAME": "SMITH",
    "BORN": {
        "CITY": "SAN JOSE",
        "STATE": "CA",
        "DATE": "11/08/82"
    },
}
```

Hierarchical data object J contains fields FIRSTNAME, LASTNAME, BORN, CITY, STATE, and DATE. FIRSTNAME and LASTNAME have atom string values "JACK" and "SMITH", respectively. BORN is a JSON object containing member fields CITY, STATE, and DATE, which have atom string values "SAN JOSE", "CA", and "11/08/82", respectively.

Each field in a JSON object is a non-leaf node and the name of the non-leaf node is the field name. Each non-empty array and non-empty object is a non-leaf node, each empty array and empty object is a leaf node. Data nodes correspond to an atom value.

Figure 4B:
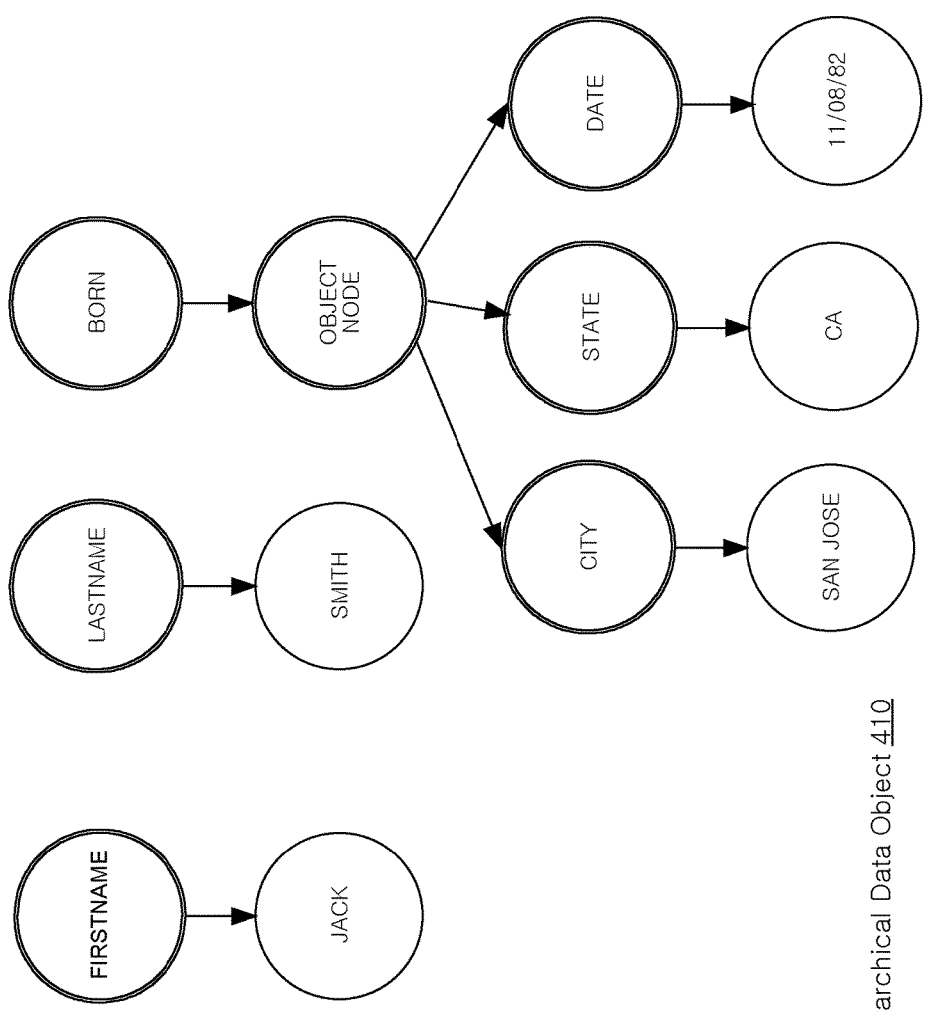
FIG. 4B is a block diagram of another example hierarchical object.

FIG. 4B depicts hierarchical data object J as hierarchical data object 410 comprising nodes as described below. Referring to FIG. 4B, there are three root nodes, which are FIRSTNAME, LASTNAME, and BORN. Each of FIRSTNAME, LASTNAME, and BORN is a field node. BORN has a descendant object node labeled OBJECT NODE.

OBJECT NODE is referred to herein as a containment node because it represents a value that may contain one or more other values. In the case of OBJECT NODE, it represents a JSON object. From the OBJECT NODE three descendant field nodes descend, which are CITY, STATE, and DATE. Another example of a containment node is an object node representing a JSON array.

Nodes FIRSTNAME, LASTNAME, CITY, and STATE have child data nodes representing atom string values "JACK", "SMITH", "SAN JOSE", and "CA", respectively. Node DATE has a descendant data node that represents the date type value "11/08/82".

Paths

A path expression is an expression comprising a sequence of "path steps" that identifies one or more nodes in a hierarchical data object based on each hierarchical position of the one or more nodes. The "path steps" may be delimited by a "/", ".", or another delimiter. Each path step may be a tag name identifying a node in a path to a node within the hierarchical data object. XPath is a query language specifying a path language for path expressions. Another query language is SQL/JSON, being developed by Oracle Corporation in conjunction with others.

In SQL/JSON, an example of a path expression for JSON is "$.BORN.DATE". The step "DATE" specifies a node having the node name "DATE". The step "BORN" specifies the node name of the parent node of node "DATE". The "$" specifies the context of the path expression, which by default is the hierarchical data object for which the path expression is being evaluated.

A path expression may also specify predicates or criteria for a step that a node should satisfy. For example, the following query $.BORN.DATE>TO_DATE('1998-09-09', 'YYYY-MM-DD')

specifies that node "BORN.DATE" is greater than the date value '1998-09-09'.

A value path is a path to a node representing a value. JSON values include a JSON object, JSON array, and JSON atom values. Thus, a path to an object, array, or a data node is a value path. Value paths in hierarchical data object J include "$.FIRSTNAME", "$.BORN, and "$.BORN.DATE".

In XML, a value path is a path to a data node. Thus, in XML fragment X, "/ZIPCODE/CODE" and "/ZI PCODE/CITY" are value paths but "/ZI PCODE" is not a value path.

Dual-Format Storage of Semi-Structured Data

On-disk storage of semi-structured data is usually self-contained, where both structures and data are stored together in one instance record. The self-contained format of the semi-structured data unnecessary increases the storage size of the data because common structures among all instances are not sharable. On the other hand, if data is stored in non-self-contained format with structures stored separately, then data import/export and distribution among different database systems becomes difficult, as the transport operations need to transport the structural dictionaries in addition to the data itself.

Using the techniques described herein, at the time a set of semi-structured documents are loaded into volatile memory, the documents are converted from the persistent-format to a mirror-format that is independent of the persistent-format. Because mirror-format is independent of the persistent-format, the two formats may be selected to achieve different goals. For example, in the persistent-format, the set of semi-structured documents may be in a self-contained format to improve performance of import/export and distribution operations. On the other hand, the mirror-format may be a format that is tailored to improving in-memory query performance.

The mirror-formats described hereafter are merely exemplary, and the techniques described herein may be used with other mirror-formats. For the purpose of illustration, a row-based mirror-format, a set-based mirror-format, and a master-detail mirror-format shall each be described in detail hereafter.

Row-Based Mirror-Format

As mentioned above, to improve query processing over semi-structured data, the semi-structured data is converted into a mirror-format as the data is loaded into volatile memory. Queries are then processed against the mirror-format version of the data. According to one embodiment, the mirror-format into which the semi-structured data is converted is a row-based mirror-format.

Converting semi-structured data into a row-based mirror-format involves logically dividing the semi-structured data (e.g. an XML document, JSON document, etc.) into three components: a field-id-name field-name-dictionary component, a tree-node-navigation component, and a leaf-scalar-value component. One technique for divided a semi-structured document into these three components is described in detail in the OSON Application, the contents of which has been incorporated herein by reference.

In general, the field-name-dictionary component created for a JSON document includes the names of all of the fields used by the JSON document. To make field-name-dictionary component more compact, a field-name appears only once in the dictionary even though that same field may repeated any number of times within the JSON document itself. For example, the fieldnames "name", "person", "birthdate" appear multiple times within the JSON document illustrated in FIG. 1. Each distinct field-name is encoded with an id. For example, "name", "person", "birthdate" may be respectively assigned the ids of "1", "2" and "3".

The tree-node-navigation component represents the tree structure of the corresponding JSON document. Rather than refer to the field-names that reside at each node in the tree structure themselves, within the tree-node-navigation component, the field-names are represented by their ids. The field-names represented by each of these ids may be determined, as mentioned above, based on the information contained in the field-name-dictionary component.

The leaf-scalar-value component stores the values that are associated with the fields that are identified in the field-name-dictionary component. For example, in the JSON document illustrated in FIG. 1, the first instance of the "name" field has the value "john". Thus, the field-name-dictionary component would associated the field "name" with some id. The field-name-dictionary component would indicate that the first node associated with that id has a value located at a particular location in the leaf-scalar-value component. Finally, the leaf-scalar-value component would have the value "john" at the specified location. Details of the specific pieces of information contained in each of the three components, according to one embodiment, is given in the OSON Application.

After the semi-structured data is divided into components, the components are loaded into volatile memory. According to one embodiment, in a row-based mirror-format, each semi-structured document is represented by a row in an in-memory table, and for any given document, each of the components is stored in a distinct column of that row. Thus, within the in-memory table, a row that corresponds to a given JSON document includes (a) the field-name-dictionary component for the JSON document, (b) the tree-navigation component for the JSON document, and (c) leaf-scalar-value component for the JSON document. In one embodiment, all three components are stored, in volatile memory, in a single column unit. Alternatively, each component may have its own column. Because all the information needed for a given JSON document is in the row that corresponds to that document, each row is "self-contained" relative to the JSON document that the row represents.

Example Row-Based Mirror-Format in an IMCU

FIG. 2 illustrates an embodiment in which data items from Table A are stored in an IMCU in a row-based mirror-format. Referring to FIG. 2, field-name-dictionary component, tree-node-navigation component and leaf-scalar-value component are stored in a single column unit (CU 222). CU 222 stores a single JSON column whose data can be logically thought of as being sub-divided into three components within the single CU 222. The specific manner in which this information is organized within IMCs may vary from implementation to implementation, and the techniques described herein are not limited to any particular manner of organizing the information within the IMC.

CU 222 includes three logical components: field-name-dictionary component 102, tree-node-navigation component 102 and leaf-scalar-value component 106. These three components respectively store field-id-name dictionary information, tree-node navigation information, and leaf-scalar-value information, mentioned above. More specifically, as explained in the OSON Application, field-name-dictionary component 102 stores a hash-code mapping, a field-name mapping, and a field-name collection. These mappings in the field-name-dictionary component 102 are referred to herein collectively as an object dictionary mapping.

The node-tree-navigation component 104 contains hierarchical trees of nodes, each hierarchical tree of nodes being for a particular hierarchical data object, as described in detail in the OSON application. Leaf-scalar-value component 106 contains field-value collections, each collection being for a particular hierarchical data object, as described above.

Column Vectors

According to an alternative embodiment, each of the components illustrated in CU 222 is instead stored its own separate column, in column-major format. That is, rather than store the components of a row contiguously in a single CU, the elements of each component are stored contiguously. The structure used to store the contiguous values of a given column is referred to herein as a Column Unit (CU), and the values stored in any given CU are collectively referred to as a column vector.

Referring again to the embodiment illustrated in FIG. 2, in-memory table A stores mirror-format versions of semi-structured documents. According to one embodiment, table A is created in volatile memory when semi-structured data, which resides on disk in persistent-format, is pre-loaded into volatile memory in the row-based mirror-format. Referring to table A, each row represents a distinct hierarchical data object. For example, each row may store information that corresponds to a distinct JSON document.

In an embodiment where each row corresponds to a distinct semi-structured document, the respective column vector elements represent a corresponding semi-structured document. In other words, information for the semi-structured document represented by the nth row of table A would be stored as the nth element in CU 222. For example, elements E11, E12, and E13 are for the field-name-dictionary component, tree-node-navigation component, and Leaf-scalar-value components of the same semi-structured document. Similarly, elements E21, E22, and E23 are the field-name-dictionary component, tree-node-navigation component, and Leaf-scalar-value components of another semi-structure document.

As described in the Mirroring Application, the column vectors may be compressed using various compression techniques. Because values within a column tend to have higher redundancy than values within a row, and the compression is performed on column vectors rather than on rows, higher compression is often achieved than would be possible with a row-major format or a textual semi-structured format.

Set-Based Mirror-Format

In the row-based mirror-format, many values within a given column may be duplicative. In particular, the semi-structured documents that are loaded into an IMCU may largely have the same field-names. When that is the case, the elements in the field-name-dictionary component of an IMCU that uses the row-based mirror-format may be highly redundant. That is, E11 may be nearly the same information as E21 because the field-names used by the JSON document represented by the first row in table A may be the same as the field-names used by the JSON document represented by the second row in table A.

The set-based mirror-format is a format designed to eliminate such redundancies. Specifically, the set-based mirror-format is created by extracting out all of the redundant parts of all rows of the in-memory table, and representing them with a shared dictionary. Specifically, in the set-based mirror-format, the common structures among the set of documents are loaded together in memory as one dictionary to save in-memory space consumption.

The Shared Dictionaries of the Set-Based Mirror Format

Figure 3:
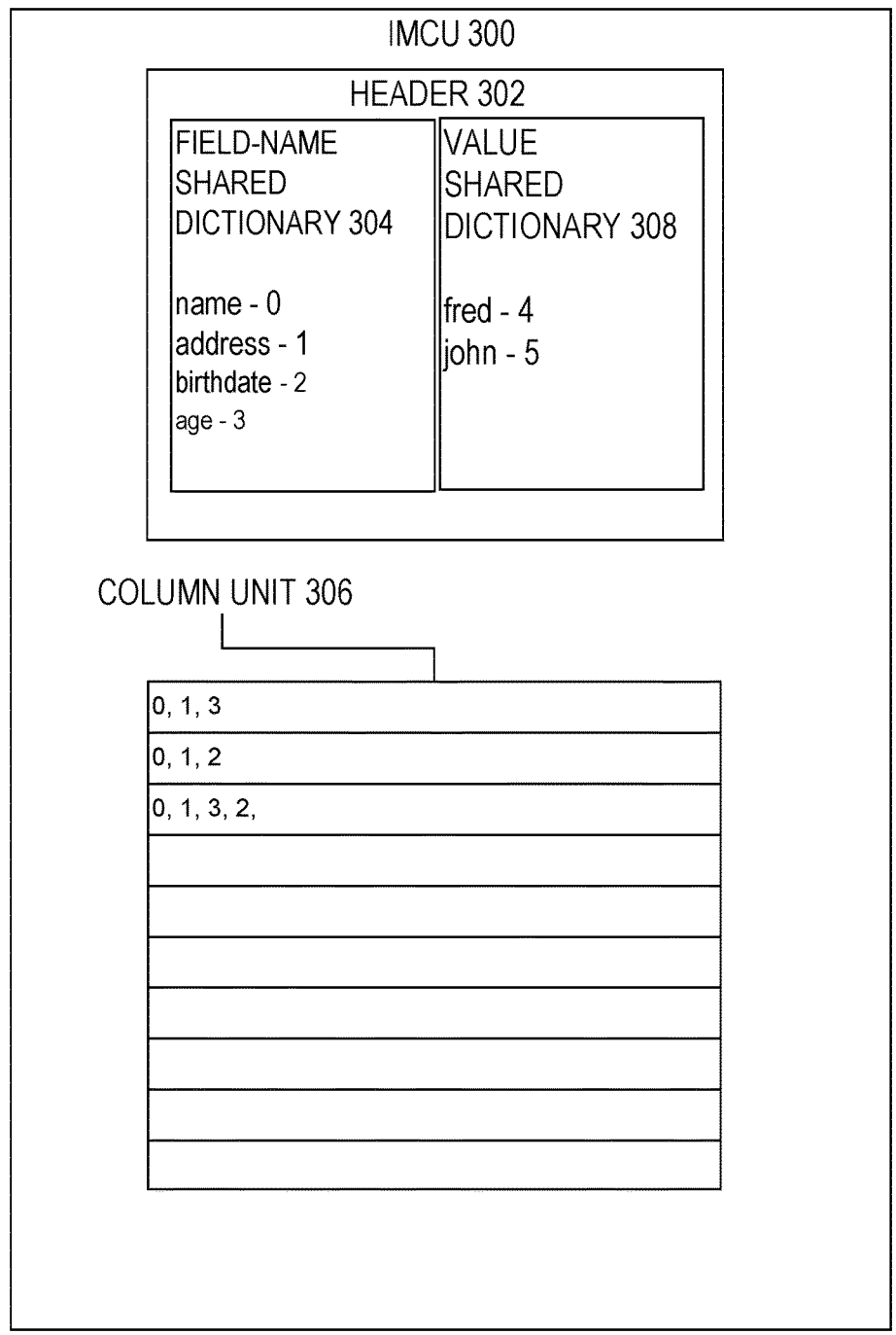
FIG. 3 is a block diagram of an IMCU that stores data from semi-structured documents in a set-based mirror-format, according to one embodiment.

Referring to FIG. 3, it illustrates an IMCU 300 in which semi-structured data is stored in a set-based mirror-format, according to one embodiment. IMCU 300 includes a header 302 that stores two shared dictionaries 304 and 308. Field-name shared dictionary 304 includes a list of all field-names in all documents that are represented by IMCU 300, where each distinct field-name is included only once regardless of how frequently the field-name appears in any document, and regardless of how many documents have fields with that fieldname. Thus, the field-name "name" would only have one entry in shared dictionary 304, even though IMCU 300 mirrors data for 100 documents, each of which have 10 to 20 instances of "name".

In the example illustrated in FIG. 3, field-name shared dictionary 304 maps the field-names "name", "address", "birthdate" and "age" to the identifiers 0, 1, 2, and 3 respectively. This example is merely illustrative. In practice, the number of field-names, which are a superset of all fieldnames appearing in any of the semi-structured documents that are mirrored in IMCU 300, may be much higher.

As illustrated, the shared dictionary 304 maps each field-name to an identifier, and the IMCU rows that correspond to semi-structured documents uses the identifiers in place of field-names. For example, the first row in column unit 306 has identifiers 0, 1, and 3 to indicate that the semi-structured document that corresponds to the row has fieldnames "name", "address" and "age". Similarly, the second row in column unit 306 has identifiers 0, 1, 2 to indicate that the semi-structured document that corresponds to the second row has field-names "name", "address" and "birthdate".

According to one embodiment, the field-name-to-identifier mapping contained in shared dictionary 304 is implicit. Specifically, each field-name appears at a particular location within shared dictionary 304. That location, can be represented as an offset from the start of the shared dictionary 304, may be used as the identifier to which the corresponding field-name maps. For example, if the field-name "name" is at offset 10184 relative to the start of shared dictionary 304, then within the rows of column unit 305, the field-name "name" may be represented by 10184.

Value shared dictionary 308 includes a list of all leaf node values of every semi-structured document that is mirrored in IMCU 300. Just as field-name shared dictionary 304 lists a field-name only once regardless of the number of occurrences of the field-name, value shared dictionary 308 lists a leaf node value only once, regardless of the number of occurrences of the leaf node value. For example, the value "john" may occur any number of times in any number of documents that are mirrored in IMCU 300, but would only appear once in value shared dictionary 308. In the embodiment illustrated in FIG. 3, value shared dictionary 308 includes leaf node values "fred" and "john" that are respectively mapped to identifiers 4 and 5.

Also similar to the field-names, the mapping of leaf node values to identifiers may be implicit. For example, within column unit 306, each leaf node value may be represented by an offset from the start of value shared dictionary 308, where the offset indicates the position, within the value shared dictionary 308, for the leaf node value.

Thus, similar to a row-based mirror-format, the set-based mirror format logically decomposes the semi-structured document (e.g. XML document, JSON document, etc.) into 3 components: field-id-name field-name-dictionary component, tree-node-navigation component, leaf-scalar-value component. However, unlike the row-based mirror-format, in the set-based mirror-format, the field-name field-name-dictionary component and leaf-scalar-value component of all semi-structured documents that are loaded in IMCU 300 are combined and loaded in memory as shared dictionaries 304 and 308. The tree navigation component, which is still maintained on a one-row-per-document basis, is stored in column unit 306. As mentioned above, in one embodiment, within column unit 306, both field-names and leaf scalar values are represented offsets into the shared dictionary 304.

Set-Based Mirror-Format Variations

As explained above, the set-based mirror-format eliminates duplicate field-names and/or field values by generating a set-level consolidation of field-name and/or field value information. The elimination of these redundancies reduces data storage needs and lowers input/output costs. For example, set-level compression may result in fast scans of multiple hierarchical data objects, and the resultant space savings may enable in-memory representations that are suitable for single instruction, multiple data (SIMD) operations.

Each hierarchical data object in the set of hierarchical data objects that are mirrored in IMCU 300 may have its own hierarchical tree of nodes (stored in column unit 306). However, the set of hierarchical data objects may share a common hash-code mapping, a common field-name mapping, and/or a common field-name collection. For example, the common hash-code mapping may be obtained by consolidating a respective hash-code mapping of each hierarchical data object in the set of hierarchical data objects, thereby achieving set-level compression of hash codes. Additionally or alternatively, the set of hierarchical data objects may share a common field-value collection.

However, in an embodiment, the set of hierarchical data objects may also share a common hierarchical tree of nodes. In such an embodiment, each hierarchical data object of the set of hierarchical data objects may be assigned an instance identifier, such as an ordinal number. A respective hierarchical tree of nodes for each hierarchical data object of the set of hierarchical data objects may be merged into a super hierarchical tree of nodes. Each node in the super hierarchical tree of nodes may store a compressed bitmap. The compressed bitmap of a particular node may store a respective instance identifier of each hierarchical data object that shares the particular node.

A leaf node in the super hierarchical tree of nodes may include an array of compressed bitmaps. Each of the compressed bitmaps in the array may correspond to a different field-value identifier and may store a respective instance identifier of each hierarchical data object that share a particular field value that corresponds to the different field-value identifier. Thus, navigation of the set of hierarchical data objects may be performed concurrently for each hierarchical data object in the set of hierarchical data objects.

For online transaction processing (OLTP) applications, storing an encoded hierarchical data object into BLOB fields may provide optimal performance, and maintaining a set-based representation may be computationally expensive. Thus, the primary storage format may be a single encoded hierarchical data object. Set-level encoding may be reserved for the mirror-format version of the hierarchical data objects.

Indexing the Shared Dictionaries

According to one embodiment, in-memory bitmap indexing structures for the dictionary 304 can be built so that when processing predicate operators over compression unit 300 (such as JSON_EXISTS(jcol, '$.a.b') or JSON_VALUE (jcol, '$.a.c?(d==4)')), the in-memory bitmap indexing structures can be used as a filter to identify what documents within compression unit 300 satisfy the predicates.

According to one embodiment, the in-memory bitmap indexing structures include a set of distinct paths for all documents stored in the corresponding IMCU. Since each document in a IMCU is identified by an IMCU ordinal slot number, therefore, for each distinct path, a bitmap of ordinal slot numbers indicating which document contains this path can be constructed so that JSON_EXISTS(jcol, '$.a.b') can be processed efficiently by finding the bitmaps for the path '$.a.b'. Furthermore, for each distinct path whose leaf is a scalar value, these scalar values can be columnar encoded in the same way as that of encoding of a normal relational scalar column in IMCU. JSON_EXISTS(jcol, '$.a.c?(d==4) ')) can be processed efficiently by doing a columnar scan of scalar number values for value 4 for path '$.a.c.d'.

While in the set-based mirror-format, instance-wise navigation for post filtering is completely feasible. That is, when represented in the set-based mirror format, the in-memory semi-structured data is efficiently accessed by both instance level and set level query operations.

Master-Detail Mirror-Format

The master-detail mirror-format is created by "shredding" the content of semi-structured documents into a relational table that is only materialized in volatile memory. However, before the content of semi-structured documents may be shredded (extracted and assigned to a column), the structure of the relational table that is to be populated with the extracted items must be determined. With structured data, determining the structure of a containing table is relatively straightforward. Specifically, the structure is usually specified in a schema, and each field in the schema maps to a corresponding column of the table. However, with semi-structured data, the structure of the documents is less uniform.

According to one embodiment, when semi-structured data is to be shredded into an in-memory table, the database system first generates a "data guide" for the semi-structured data. Various techniques may be used to generate data guides for semi-structured data. Some techniques for generating data guides for semi-structured data are described in detail in U.S. patent application Ser. No. 14/699,685, filed Apr. 29, 2015, (the "Data Guide Application"), the entire contents of which are incorporated herein.

Once a data guide has been generated for the set of semi-structured documents that are to be pre-loaded into volatile memory, an in-memory relational view is created based on the data guide, and then populated with data from the semi-structured documents. According to one embodiment, the in-memory relational view is stored in column-major format within an IMCU. The IMCU is then accessed during query processing in the manner described in the Mirroring Application.

Generating a Data Guide for a Set of Semi-Structured Documents

As explained above, when a master-detail format is the mirror-format that is to be used to pre-load a particular collection of semi-structured documents into volatile memory, a data guide for the collection of semi-structured documents must first be generated. Examples of hierarchical data objects that can be converted to the master-detail format include but are not limited to (a) documents that conform to XML (Extensible Mark-up Language), and (b) data objects that conform to JSON (JavaScript Object Notation). The data guide may be created and/or updated as hierarchical data objects are added to the collection.

The data guide in effect defines a schema of the hierarchical data objects in the collection. However, according to approaches described herein, the collection of hierarchical data objects may be considered schema-less because a hierarchical data object does not have to conform to a schema to be added to the collection. Further, unlike a schema-based approach, which requires that a hierarchical data object conform to a schema before being added to a collection, a schema is generated in response to adding the hierarchical data object to the collection.

Because of the availability of a schema, the in-memory copy of the hierarchical data objects may be queried using the powerful query capabilities of a RDBMS. According to an embodiment of the present invention, in-memory relational views of a collection of hierarchical data objects are generated using a data guide.

Illustrative Data Guide

FIG. 5 represents an illustrative data guide according to an embodiment of the present invention. A data guide describes the structure of a collection of hierarchical data objects, such as JSON hierarchical data objects. A data guide may also include statistics about the structure, such as the maximum value found at a particular value path within the collection. As shall be explained in greater detail, the data guide is updated as hierarchical data objects are added to a collection of hierarchical data objects. According to an embodiment, a data guide comprises data guide entries, each data guide entry containing a value path found in the collection of hierarchical data objects, and containing data describing data characteristics or properties of the values found at the value path; such data describing one or more data characteristics is referred to herein as a value descriptor.

Referring to FIG. 5, it depicts Data Guide 501. As depicted in FIG. 5, Data Guide 501 reflects the structure of a hierarchical data object collection after adding hierarchical data object J and a hierarchical data object K as the first hierarchical data objects to a collection of hierarchical data objects.

According to an embodiment, Data Guide 501 is a table having entries in the form of rows with columns, each row defining a value path found in a collection of hierarchical data objects. The columns of Data Guide 501 include PID, PATH, DATATYPE, MIN, and MAX.

For a given row in Data Guide 501, column PATH contains a path expression representing a value path found in the collection of hierarchical data objects. PID holds a path identifier assigned to a particular value path. Other columns in Data Guide 501 hold values that together comprise a value descriptor of values found at the particular value path. Fields such as these columns that hold values that describe a data characteristic are referred to herein as value descriptor attributes.

Path value attributes in Data Guide 501 include DATATYPE, MAX, and MIN. DATATYPE contains datatype identifiers that identify the data types of values found at a value path within the collection of hierarchical data objects. Columns MAX and MIN are described later.

Referring to FIG. 5, row 1 in Data Guide 501 holds path identifier 1 in column PID. A row in Data Guide 501 is referred to herein by the path identifier held in the PID column of the row. Row 1 includes path expression FIRST-NAME in column PATH and the value STRING in column DATATYPE, thereby specifying the data type of the values found at this value path is the STRING data type. Note the context step "$" is not in the path expression but may be viewed as being implicitly specified as the first step in the path expression. Row 3 includes path expression BORN in column PATH and the value { } in column DATATYPE, thereby specifying the data type of the values found at this value path belong to the JSON object data type. Row 6 includes path expression BORN.DATE in column PATH and the value DATE in column DATATYPE, thereby specifying the data type of the values found at this value path belong to the JSON date data type.

Columns MIN and MAX hold statistics that are illustrative of the value descriptor attributes that may be stored within a data guide. For a given row, column MIN contains a minimum value about a particular property of the values found at the respective value path with the respective collection of hierarchical data objects. In Data Guide 501, the particular property depends on the data type specified in column DATATYPE. For example, in column MIN in row 1, the value 4 represents the minimum length of any string value. In row 6, the column MIN reflects the earliest date value at the value path, which in this case is 11/08/82.

Similarly for column MAX, column MAX contains a maximum value about a particular property of the values found at the respective value path within the collection. In Data Guide 501, the particular property depends on the data type. For example, in column MAX in row 1, the value 7 represents the maximum length of any string value at value path FIRSTNAME. In row 6, the column MAX reflects the latest date value at the value path, which in this case is 09/10/95.

A data guide may be used to describe many forms of collections of hierarchical data objects, such as hierarchical data objects stored in a database table. According to an embodiment, a collection of hierarchical data objects comprises hierarchical data objects stored in a column having a column data type as XML or as JSON.

Automatic Generation of Views

As mentioned above, once a Data Guide has been generated for a given population of semi-structured documents, the Data Guide may be used to convert the semi-structured documents to the master-detail memory-format. Specifically, the master-detail in-memory format involves shredding the data from the semi-structured documents based on the Data Guide, and populating in-memory views based with the data.

In the absence of a Data Guide, defining such views may entail manually writing DDL statements that have complicated path expressions and relational constructs to specify what values in the hierarchical data object to present in a relational view, a manual task that can be error prone. However, according to one embodiment, information in the Data Guide of a given set of semi-structured documents is used to automatically generate an in-memory view of the collection of hierarchical data objects, thereby avoiding the need to manually write complex DDL statements.

According to an embodiment of the present invention, a utility is provided that automatically generates a DDL statement that may be submitted to a DBMS to generate an in-memory view of a set of semi-structured documents. Arguments for the utility may be used to specify a name for the view and which value paths to present in the relational view. The utility is referred to herein as JSON_RelationViewGenerator, and is described in detail in the Data Guide Application.

To illustrate automated generation of relational views, an illustrative JSON object and data guide is provided in FIGS. 6 and 7. FIG. 6 depicts an object V. Object V includes an array LineItems.

FIG. 7 depicts DATA GUIDE 701. FIG. 8 depicts relational views that may be generated using JSON_RelationViewGenerator.

Referring to FIG. 7, DATA GUIDE 701 is a data guide for a column jcol in a table jtab (see DDL statements in FIG. 7). The value path values depicted in FIG. 7 are generated from object V. DATA GUIDE 701 may also include value descriptor attributes that are not depicted in FIG. 7.

The relational views are represented in FIG. 8 by DDL statements that may be used to define the views. Such DDL statements are generated by JSON_RelationViewGenerator.

Referring to FIG. 8, view SCALAR-VIEW is a view of scalar values that are not embedded within an array structure. According to an embodiment, JSON_RelationViewGenerator takes several arguments, which include a first argument ("view name argument") denoting the view name "scalar-view", and a second argument ("path id argument") denoting "*", specifying to return all fields for scalar values that are not nested within an array.

JSON_RelationViewGenerator may take one or more additional arguments to identify the table and JSON column that stores a collection for which to generate a view, and to identify the data guide.

JSON_RelationViewGenerator is configured to generate a view with column names having the same name as a corresponding field in a JSON hierarchical data object. Generating a view in this way is accomplished through the use of the JSON_TABLE table function, which returns values from a JSON hierarchical data object as relational column values. An embodiment of the JSON_TABLE function is described in Oracle® Database, SQL Language Reference, 12c Release 1 (12.1), E41329-12, pages 145-165, the contents of which are incorporated herein by reference.

The JSON_TABLE table function declaration view includes arguments for a columns clause that specifies columns to return, and for each column, a column name, column data type, and path expression that resolves to a JSON value to return. For example, in view SCALAR-VIEW, the column clause argument Id varchar(40) path '$._id' specifies column name id, the data type varchar(40), and the path expression '$._id'; the column clause argument StoreNo number path '$.StoreTransaction.StoreNo' specifies column name StoreNo, data type number, and path expression '$.StoreTransaction.StoreNo'.

When JSON_RelationViewGenerator is invoked, the utility examines the data guide to determine which rows represent fields for scalar values that are not nested within an array. JSON_RelationViewGenerator uses information in the data guide to generate a DDL statement defining a relational view. For example, JSON_RelationViewGenerator uses value paths in column PATH and data types in column DATATYPE to determine how to define columns in the column clause of view SCALAR-VIEW.

View SELECT-SCALAR-VIEW projects columns of specific value paths specified by a path id argument, the argument value being '1,3'. This value lists path identifiers that identify rows of value paths in DATA GUIDE 1001. Hence, view SELECT-SCALAR-VIEW includes columns for value paths '$._id' and '$.StoreTransaction.StoreNo'.

Likewise, view ARRAY-VIEW projects columns of value paths specified by the path id argument. View ARRAY-VIEW projects columns of specific value paths specified by the path id argument, the argument value being '1,9-11'. This value lists path identifiers that identify rows of value paths in DATA GUIDE 1001. Among these value paths are value paths for fields of elements of an array. To project the array elements, ARRAY-VIEW includes a join between two JSON_TABLE table functions. JSON_TABLE function J returns three columns Code, Amount, and Cancelledamount.

In-Memory Materialization of Views

As explained above, Data Guides may be automatically generated for a collection of semi-structured documents, and view definitions may be automatically generated based on the Data Guides. According to one embodiment, such automatically-generated view definitions are then used to materialize, only within volatile memory, views of the semi-structured data. Such in-memory views present the semi-structured documents in master-detail mirror-format.

According to one embodiment, for a given collection of semi-structured documents, all three steps (automatically generating the Data Guide, automatically generating the view definition, and automatically materializing the view within volatile memory) are performed at the time the semi-structured documents are to be preloaded in volatile memory. In an alternative embodiment, the Data Guide may be generated and constantly maintained up-to-date before the time to pre-load the semi-structured data. Thus, at the time of pre-loading, only the view generation and in-memory view materialization occur. In yet another alternative embodiment, both the Data Guide generation and the view definition generation occur before the semi-structured data is to be pre-loaded. Consequently, at the time of pre-loading, only the in-memory view materialization is performed.

The in-memory views created for semi-structured documents may be stored in volatile memory in a variety of ways. For example, the views may simply be stored in volatile memory in the same format as such views would have if materialized on disk. Typically, the data for such views would be in row-major format. On the other hand, the in-memory views may be stored in column-major format within IMCUs. In such a format, for each column, the values of the column are stored contiguously in a Column Unit. Further, various compression techniques may be applied to each column to reduce the amount of volatile memory consumed by each column unit.

In-Memory Textual Representation

In addition to storing semi-structured data in volatile memory in a mirror format, a database server may also store, in volatile memory, a textual version of the semi-structured documents. The in-memory textual version of the semi-structured documents may be accessed under a variety of circumstances. For example, the mirror-format data may be compressed. When compressed, the mirror-format data may be treated as read-only to avoid having to decompress, change, and recompress the mirror-format data with each Data Manipulation Language (DML) operation. Because the mirror-format data is treated as read-only, the data may be marked as invalid (rather than being changed) in response to DML operations. If the mirror-format data for a document has been invalidated and the changes have not been journaled, then using the mirror-format data for that document to answer a query is not possible. Therefore, the in-memory textual version may be accessed instead of incurring the disk I/O required to access the on-disk version of the document.

As another example, the mirror-format information for a document may be used to determine whether the document satisfies a query, but the values returned by the query may be extracted from the in-memory textual version of the document. However, maintaining the textual in-memory version in addition to the mirror-format information consumes more memory resources, and extracting data from the in-memory textual version generally involves parsing operations.

Pre-Loading the Mirror Data

Before MF data may be used to satisfy a query, the PF data must be loaded into volatile memory and converted into the mirror-format. The persistent-format in which hierarchical data objects are stored persistently may be text based, or compression-based, such as a dictionary encoded hierarchical data object. Because the MF data is in a format that is different than PF data, volatile memory is initially populated by (a) reading the PF data from persistent storage and (b) converting the PF data thus obtained to the mirror-format.

The decision about when to create the MF data may be based on a variety of factors. For example, if sufficient time and memory are available at system start-up, all of the PF data that has been selected for mirroring may be pre-loaded into volatile memory on start up. Thus, in one embodiment, semi-structured data is pre-loaded into volatile memory at database system start up. The pre-loading may be performed, for example, by background processes before any database operation is executed against the memory-enabled data structures that contain the data items that will be mirrored by the MF data.

On the other hand, to reduce start-up time, some or all of the PF data that has been selected for mirroring may be loaded on an as-needed-basis. That is, even though a set of semi-structured documents has been selected for mirroring, none of the documents are actually mirrored until a database command actually attempts to access one of the documents. In response to the attempt to access one of the documents, all documents in the set may be pre-loaded.

As explained above, loading the MF data involves reading the corresponding PF data from persistent storage and then converting that PF data into the mirror-format. An event that triggers the loading/converting-operation is referred to herein as a "load-trigging event". As mentioned above, load-triggering events may include, but are not limited to, system start up and requests to access the corresponding PF data.

In one embodiment, users may set configuration options to indicate which MF data to pre-load, and which MF data to load on-demand. In an alternative embodiment, the database server automatically determines which portions of the MF data are pre-loaded and which are loaded on-demand. In general, the more frequently a data item is used, the more likely the database server will automatically pre-load the data item into MF data so that even the first database operation that requires the data item has the option of obtaining the data from the MF data.

Importantly, the PF data from which MF data is created may be stored persistently in multiple formats and be from multiple sources. That is, there may be multiple sources of PF data, each of which may employ a different persistent-format. For example, PF data may be stored in an HADOOP system in the form of JSON objects. The PF data may retrieved through external tables as described in U.S. application Ser. No. 14/685,840, Accessing an External Table in Parallel to Execute A Query, filed by Daniel McClary, et al., on Apr. 14, 2015, the entire contents of which incorporated herein by reference. The data retrieved is converted into the mirror-format.

An important advantage of the IMCU approach is that hierarchal objects may be stored persistently in a database (or outside a database) in any format. The hierarchical data objects do not have to be converted to a different format when added to the database. It is expected that hierarchical data objects may be stored persistently in text form. The hierarchical data objects are converted to the mirror-format when pre-loaded into volatile memory.

MF data may be created one-IMCU at a time. In a multi-instance environment, durably stored metadata may be used to determine which MF data is pre-loaded into each of the database server instances. Such metadata may include, for example, a data-to-IMCU mapping and an IMCU-to-instance mapping.

The Pre-Loading Process

Figure 9:
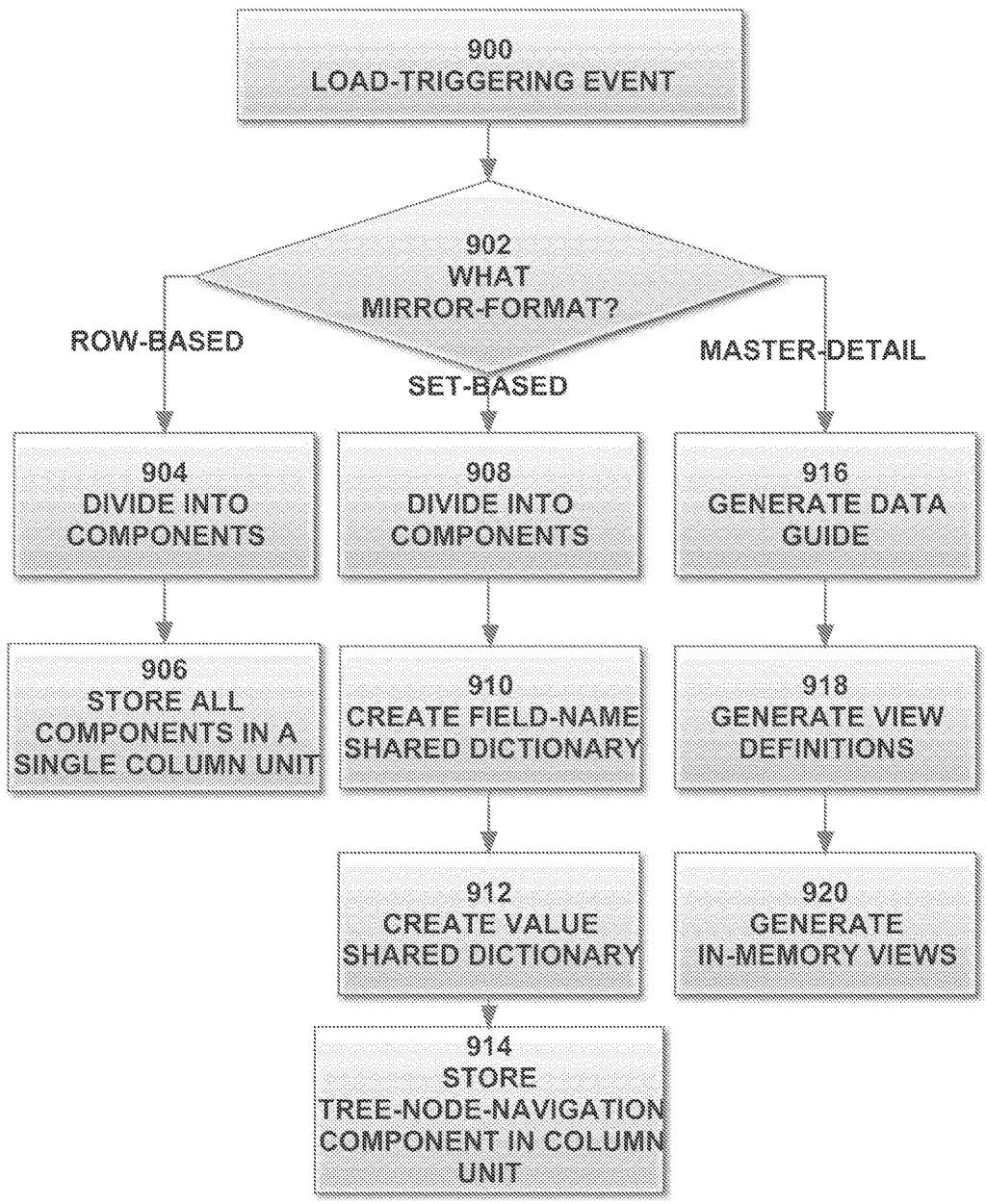
FIG. 9 is a flowchart illustrating steps for creating MF data in response to a load-triggering event, according to an embodiment.

Referring to FIG. 9, at step 900 a load-triggering event occurs within a database system. For the purpose of explanation, it shall be assumed that the PF data involved in the pre-load operation are a set of JSON documents, and that the load-triggering event is receipt, by the database system, of a query that targets one or more JSON documents in the set.

At step 902, the database system determines the mirror-format into which to convert the set of JSON documents. The database system may select the format automatically based on a variety of factors, such as the amount of memory available, the field-name and leaf-scalar-value commonality across the set of objects, etc. Alternatively, the database system may simply read a format preference, previously-specified by the user. Such preferences may be specified, for example, on a database object by database object basis. For example, a user may specify that a table X is to be mirrored in the row-based in-memory format, while table Y is to be mirrored in the set-based in-memory format.

Responsive to determining that the mirror-format for the set of JSON documents is to be the row-based mirror-format, components are generated for the JSON documents (step 904), and all components are stored, on a one-row-per-document-basis, in a single column unit within an IMCU (step 906).

On the other hand, if the database system determines that the mirror-format for the set of JSON documents is to be the set-based mirror-format, at step 908 the data from the JSON documents is divided into components similar to step 904. However, rather than store each component in a column unit, a shared dictionary is crated for the field-names (step 910) and a shared dictionary is created for the values (step 912). The tree-node information is stored in a column unit 914. Within that column unit, field-names may be represented by their offsets into the field-name dictionary, and values may be represented by their offset into the value dictionary.

If the database system determines that the mirror-format for the set of JSON documents is to be the master-detail mirror-format, then a Data Guide is generated at step 916 for the set of JSON documents, if a Data Guide does not already exist. At step 918, view definitions are generated based on the Data Guide, if such view definitions do not already exist. Finally, at step 920, memory-only views are instantiated based on the view definitions. Within the memory-only instantiation, the values for each column of the view may be stored in a separate compressed column unit.

Maintaining Consistency Between MF Data and PF Data

In-memory MF data is maintained transactionally consistent with the PF data. The MF data is transactionally consistent in that any data items provided to a transaction from the MF data will be the same version that would have been provided if the data items were provided from the PF data. Further, that version reflects all changes that were committed before the snapshot time of the transaction, and no changes that were committed after the snapshot time of the transaction. Thus, when a transaction, that made a change to a data item that is mirrored in the MF data, is committed, the change is made visible relative to both the PF data and the MF data. On the other hand, if a transaction that made a change is aborted or rolled back, then the change is rolled back relative to both the PF data and the MF data.

In one embodiment, the same transaction manager that ensures consistency among the reads and writes of the PF data is also used to ensure consistency among the reads and writes of the MF data. Because the MF data is kept current in a transactionally consistent manner, if the in-memory MF data includes the data required by a database operation, then the database operation may be satisfied either from the in-memory MF data, or from the PF data.

The MF data mirrors data that already exists in the PF data. However, while all items in the MF data are mirror versions of corresponding items in the PF data (albeit organized in a different format), not all items in the PF data need be mirrored in the MF data. Thus, the MF data may be a subset of the PF data.

Because not all of the PF data is necessarily mirrored in the MF data, in some situations queries may require data that can only be satisfied by the PF data. For example, if a table has columns A, B and C, and only column A is mirrored in the MF data, then a query that requires values from column B must obtain those values from the PF data.

However, even in those circumstances, the MF data may still be used to (a) satisfy a portion of the query, and/or (b) speed up the retrieval of required data from the PF data. For example, the MF data may be used to identify the specific rows that must be retrieved from the PF data.

According to one embodiment, to reduce overhead, no on-disk copy of the MF data is maintained. In an alternative embodiment, a copy of the MF may be stored, but no attempt is made to keep the on-disk copy of the MF data in sync with updates that are being performed on the PF data. Consequently, after a failure, the in-memory MF data must be reconstructed based on the persistent copy of the PF data.

According to one embodiment, the mirror-format version of semi-structured document (whether row-based mirror-format, set-based mirror-format, or master-detail mirror format) is maintained transactionally consistent with the persistent-format version of semi-structured data using the techniques described in the Mirroring Application. For example, once constructed, the IMCUs containing the semi-structured data may be treated as read-only. Thus, when an update is made to a JSON document, the corresponding row in the IMCU is invalidated rather than updated. To record the update, the change may be stored in an in-memory journal. When a threshold percentage of rows within an IMCU have been invalidated, the IMCU may be rebuilt. Rebuilding an IMCU that reflects semi-structured documents involves reading the persistent-format version of those documents, converting the data into one of the mirror-formats, and storing the converted data in a new IMCU.

Handling Queries that Access Semi-Structured Data that is Mirrored

In an embodiment, MF data mirrors data that exists in the persistent-format. However, while all items in the MF data are mirror versions of corresponding items in the PF data (albeit organized in a different format), not all items in the PF data need be mirrored in the MF data. Thus, the MF data may be a subset of the PF data.

Further, even if all of the semi-structured documents that are targeted by a query are mirrored in volatile memory, some of the mirrored data may be invalid. For example, some of the documents may have been updated, where the updates were made to the PF data but not to the MF data. Rather than update the MF data, the MF data corresponding to the updated documents may simply be marked as invalid.

Because not all of the PF data is necessarily mirrored and valid in the MF data, in some situations queries may require some data that can only be satisfied by the PF data. For example, table A as mirrored in IMCU form in FIG. 2 may only contain some of the hierarchical data objects stored in an on-disk table A stored in PF form. For example, IMCU 1 and IMCU2 each only have 10 rows. Thus, the in-memory table A stores MF data for twenty semi-structured documents. However, the on-disk copy of table A may store hundreds of semi-structured documents in the persistent-format.

Consequently, a query may require access to JSON objects in table A that are not in the in-memory version of table A. A DBMS executing a query in these circumstances must be configured to obtain JSON objects from both the IMCU and PF sources. For example, in a DBMS that executes a query that accesses JSON hierarchical data objects in table A, the query is rewritten by the DBMS into an SQL query to incorporate path-based operators for accessing the JSON objects. Implementations of the operators may be configured to access JSON objects that are either stored in the IMCU format or in text form persistently in table A.

Path-based operators for accessing hierarchical data objects, such as JSON, are described U.S. patent application Ser. No. 14/337,189 (U.S. Patent Publication No. 2015-0039587A1), entitled Generic SQL Enhancement To Query Any Semi-Structured Data And Techniques To Efficiently Support Such Enhancements, filed by Zhen Hua Liu, et al. on Jul. 21, 2014, the entire contents of which are incorporated herein by reference.

Benefits of IMCU Form

According to one embodiment, the IMCU format is completely independent of the persistent format. However, the MF data is initially constructed in memory based on the persistently stored PF data, not based on any persistent IMCU structures. Since persistent structures are not required, users of existing databases need not migrate the data or structures in their existing databases to another format. Users may retain text form hierarchical objects without having to convert the objects to a PF. In fact, the PF of the hierarchical data objects may be heterogeneous. e. g. text, encoded, or relational.

Storing hierarchical data objects in IMCU form makes powerful capabilities inherent to IMCU form available for accessing hierarchical data objects. For example, min and max values of one or more of the columns that are mirrored in an IMCU may be stored in memory. The min and max values may be used to quickly determine whether a column that is mirrored in the IMCU has any value that can satisfy a query predicate that references the column. For example, if the IMCU stores values for the column "age", and the min/max values are 10 and 20, respectively, then the database server can immediately determine that the predicate "age>30" will not be satisfied by any data in the IMCU.

Furthermore, an IMCU may contain or be associated with bitmap indexes of fieldnames in the object set dictionary or field values in the common field-value dictionary. The bitmap indexes indicate which rows in an IMCU include a fieldname or field value.

Transparently Enabling Semi-Structured Data in-Memory Option

Database systems often have predefined data types for storing semi-structured data. For example, the datatype XMLtype may be used to store XML documents may in a column of a relational table. Similarly, the datatype JSONtype may be used to store JSON documents in a column of a relational table.

According to one embodiment, when a column of semi-structured datatype is created, or when a column has a check constraint to enforce the data of particular semi-structure datatype, the database server internally adds a hidden column that computes the in-memory format of the semi-structure data. According to one embodiment, this hidden column is populated by converting the semi-structured data into the appropriate mirror-format. The database server then loads the contents of the hidden column into volatile memory in response to a load-triggering event.

Transparently Rewriting Queries that Target Semi-Structured Data to Make Use of MF Data According to one embodiment, user queries never need to be modified by the user when querying semi-structured data to take advantage of the fact that the semi-structured data may be available in volatile memory in the mirror-format. To avoid the need for users to modify queries to take advantage of mirror-format versions of data, during query compile time, when the optimizer decides to use an in-memory execution plan to run the query, for any semi-structured SQL operators (for example, json_exists( ), xmlexists( ), json_query( ), xmlquery( ), json_value( ), xmlcast( )), the database server rewrites the queries to access the MF data.

How the queries are rewritten to take advantage of the MF data may vary from implementation to implementation. For example, in an embodiment where the MF data is treated as a hidden column of a table, the database server may rewrite the query internally by adding to the user's query the hidden column as the last argument to the operator. Consequently, during run time, when in-memory compression units are being scanned, the hidden column values are set to point to values inside the in-memory compression unit so that semi-structured SQL operators can use the MF data for query evaluation.

Variations

Embodiments have been described in which, for a given set of semi-structured documents, data from the documents are stored in one format (the PF format) on persistent storage, and in another format (the MF format) in volatile memory. However, in alternative embodiments, both formats may be stored on persistent storage, or both formats may be stored in volatile memory. Storing both formats on persistent storage has the benefit of reducing the amount of relatively expensive volatile memory needed for the system. On the other hand, storing both formats in volatile memory has the benefit of increasing query processing speed, even in situations where the data needed by the query has been invalidated in the MF format and therefore has to be retrieved from the PF format data.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
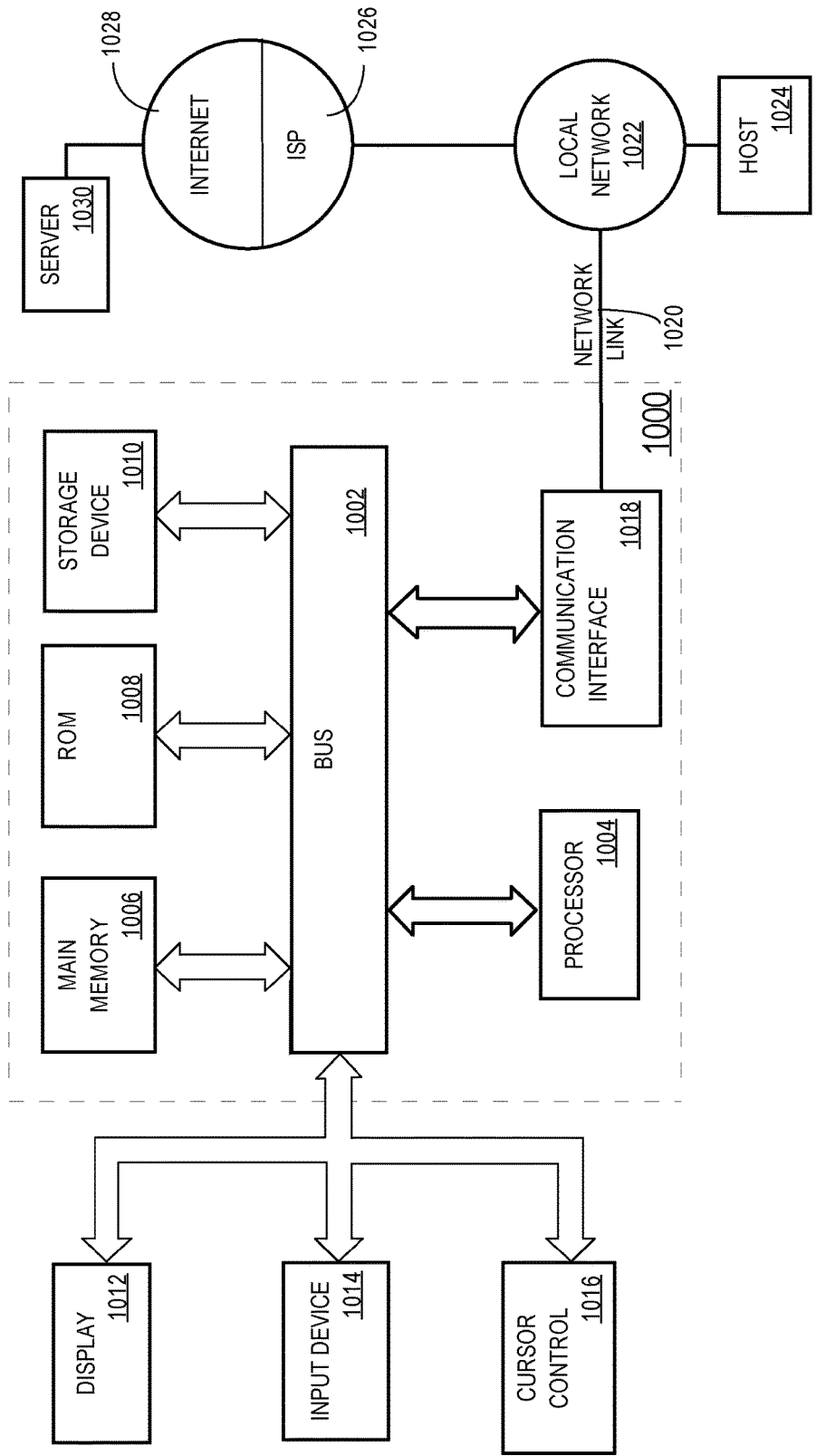
FIG. 10 is a block diagram of a computer system with which the techniques described herein may be performed.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   maintaining, by a database server, a set of first-format data;
   wherein the database server maintains the set of first-format data on persistent storage;
   wherein the set of first-format data:
      is accessible to the database server,
      represents a set of semi-structured documents, and
      is stored in a first-format;
   converting, by the database server, the set of first-format data to a second-format to produce a set of second-format data;
   wherein the second-format is one of:
      a row-based mirror format;
      a set-based mirror format; or
      a master-detail mirror format;
   wherein the database server maintains the set of second-format data in volatile memory;
   wherein the second-format is different from and independent of the first-format;
   wherein the set of second-format data is accessible to the database server;
   the database server executing database operations that make changes to the set of first-format data;
   the database server maintaining the set of second-format data transactionally consistent with the set of first-format data as the database server executes database operations that make changes to the set of first-format data;
   wherein maintaining the set of second-format data transactionally consistent with the set of first-format data as the database server executes database operations that make changes to the set of first-format data includes ensuring that any data items provided to a transaction from the set of second-format data are the same version that would have been provided if the data items were provided from the set of first-format data;

receiving, by the database server, a request to execute a database command that requires particular information from the set of semi-structured documents; and in response to receiving the request, the database server executing the database command;

wherein, during execution of the database command, the database server obtains at least some of the particular information from the set of second-format data.

2. The method of claim 1 further comprising the database server rewriting the database command to cause execution of the database command to obtain at least some of the particular information from the set of second-format data.

3. The method of claim 1 wherein:
the set of first-format data is stored in an on-disk table; and
the second-format is the master-detail mirror format in which information about the set of semi-structured documents is stored in a hidden column of the on-disk table.

4. The method of claim 1 further comprising, during execution of the database command, the database server obtaining a first portion of the particular information from the set of second-format data, and a second portion of the particular information from the set of first-format data.

5. The method of claim 1 wherein:
the second-format is the row-based mirror format; and
converting the set of first-format data to the second-format comprises generating an in-memory table in which each row has a field-name-dictionary component, a tree-node-navigation component, and a leaf-scalar-value component for a document that corresponds to the row.

6. The method of claim 5 wherein a separate column unit stores each of the field-name-dictionary component, the tree-node-navigation component, and the leaf-scalar-value component.

7. The method of claim 5 wherein a single column unit stores the field-name-dictionary component, the tree-node-navigation component, and the leaf-scalar-value component.

8. The method of claim 1 wherein the second-format is the set-based mirror format, and converting the set of first-format data to the second-format comprises:
generating an in-memory table in which:
each row of the in-memory table corresponds to a corresponding document from the set of semi-structured documents; and
each row has a tree-node-navigation component for the corresponding document that corresponds to the row; and
generating a shared dictionary for at least one of:
a field-name-dictionary component of all documents in the set of semi-structured documents; or
a leaf-scalar-value component of all documents in the set of semi-structured documents.

9. The method of claim 8 further comprising generating an in-memory bitmap index for the shared dictionary.

10. The method of claim 1 wherein the second-format is the master-detail mirror format, and converting the set of first-format data to the second-format comprises:
generating a data guide for the set of semi-structured documents;
based on the data guide, generating one or more view definitions; and
generating an in-memory view for each view definition of the one or more view definitions.

11. The method of claim 10 wherein:
the step of generating the data guide is performed before the database server receives the request; and
the step of generating the in-memory view is performed after the database server receives the request.

12. The method of claim 10 wherein both generating the data guide and generating the in-memory view are performed after the database server receives the request.

13. The method of claim 1 wherein maintaining the set of second-format data transactionally consistent with the set of first-format data comprises, in response to an operation that performed an update to a particular semi-structured document in the set of semi-structured documents, invalidating a portion of the set of second-format data that corresponds to the particular semi-structured document.

14. The method of claim 13 further comprising, in response to the operation that updates the particular semi-structured document, storing an entry that reflects the update in an in-memory journal associated with the set of second-format data.

15. The method of claim 1 wherein the second-format is the set-based mirror format and the step of converting the set of first-format data to the second-format comprises merging a hierarchical tree of nodes of each document in the set of semi-structured documents to generate a super hierarchical tree of nodes.

16. The method of claim 15 further comprising generating a compressed bitmap for each node in the super hierarchical tree of nodes, wherein the compressed bitmap for each node indicates which semi-structured documents in the set of semi-structured documents share the node.

17. The method of claim 1 further comprising storing, in volatile memory in conjunction with the set of second-format data, a textual version of documents from the set of semi-structured documents.

18. The method of claim 17 further comprising:
the database server using the set of second-format data to determine which documents satisfy a predicate of a query; and
the database server generating a result set of the query by extracting values from the textual version of documents that is stored in volatile memory in conjunction with the set of second-format data.

19. One or more non-transitory computer-readable media having stored thereon instructions that, when executed by one or more computing devices, cause a database server to perform:
maintaining, by a database server, a set of first-format data;
wherein the database server maintains the set of first-format data on persistent storage;
wherein the set of first-format data:
is accessible to the database server,
represents a set of semi-structured documents, and
is stored in a first-format;
converting, by the database server, the set of first-format data to a second-format to produce a set of second-format data;
wherein the second-format is one of:
a row-based mirror format;
a set-based mirror format; or
a master-detail mirror format;
wherein the database server maintains the set of second-format data in volatile memory;

wherein the second-format is different from and independent of the first-format;
wherein the set of second-format data is accessible to the database server;
the database server executing database operations that make changes to the set of first-format data;
the database server maintaining the set of second-format data transactionally consistent with the set of first-format data as the database server executes database operations that make changes to the set of first-format data;
wherein maintaining the set of second-format data transactionally consistent with the set of first-format data as the database server executes database operations that make changes to the set of first-format data includes ensuring that any data items provided to a transaction from the set of second-format data are the same version that would have been provided if the data items were provided from the set of first-format data;
receiving, by the database server, a request to execute a database command that requires particular information from the set of semi-structured documents; and
in response to receiving the request, the database server executing the database command;
wherein, during execution of the database command, the database server obtains at least some of the particular information from the set of second-format data.

20. The one or more non-transitory computer-readable media of claim 19, wherein the instructions further comprise instructions that, when executed by one or more computing device, cause: the database server rewriting the database command to cause execution of the database command to obtain at least some of the particular information from the set of second-format data.

21. The one or more non-transitory computer-readable media of claim 19 wherein:
the set of first-format data is stored in an on-disk table; and
the second-format is the master-detail mirror format in which information about the set of semi-structured documents is stored in a hidden column of the on-disk table.

22. The one or more non-transitory computer-readable media of claim 19 wherein the instructions further comprise instructions that, when executed by one or more computing device, cause: during execution of the database command, the database server obtaining a first portion of the particular information from the set of second-format data, and a second portion of the particular information from the set of first-format data.

23. The one or more non-transitory computer-readable media of claim 19 wherein:
the second-format is the row-based mirror format; and
converting the set of first-format data to the second-format comprises generating an in-memory table in which each row has a field-name-dictionary component, a tree-node-navigation component, and a leaf-scalar-value component for a document that corresponds to the row.

24. The one or more non-transitory computer-readable media of claim 23 wherein a separate column unit stores each of the field-name-dictionary component, the tree-node-navigation component, and the leaf-scalar-value component.

25. The one or more non-transitory computer-readable media of claim 23 wherein a single column unit stores the field-name-dictionary component, the tree-node-navigation component, and the leaf-scalar-value component.

26. The one or more non-transitory computer-readable media of claim 19 wherein the second-format is the set-based mirror format, and converting the set of first-format data to the second-format comprises:
generating an in-memory table in which:
each row of the in-memory table corresponds to a corresponding document from the set of semi-structured documents; and
each row has a tree-node-navigation component for the corresponding document that corresponds to the row; and
generating a shared dictionary for at least one of:
a field-name-dictionary component of all documents in the set of semi-structured documents; or
a leaf-scalar-value component of all documents in the set of semi-structured documents.

27. The one or more non-transitory computer-readable media of claim 26 wherein the instructions further comprise instructions that, when executed by one or more computing device, cause: generating an in-memory bitmap index for the shared dictionary.

28. The one or more non-transitory computer-readable media of claim 19 wherein the second-format is the master-detail mirror format, and converting the set of first-format data to the second-format comprises:
generating a data guide for the set of semi-structured documents;
based on the data guide, generating one or more view definitions; and
generating an in-memory view for each view definition of the one or more view definitions.

29. The one or more non-transitory computer-readable media of claim 28 wherein:
the step of generating the data guide is performed before the database server receives the request; and
the step of generating the in-memory view is performed after the database server receives the request.

30. The one or more non-transitory computer-readable media of claim 28 wherein both generating the data guide and generating the in-memory view are performed after the database server receives the request.

31. The one or more non-transitory computer-readable media of claim 19 wherein maintaining the set of second-format data transactionally consistent with the set of first-format data comprises, in response to an operation that performed an update to a particular semi-structured document in the set of semi-structured documents, invalidating a portion of the set of second-format data that corresponds to the particular semi-structured document.

32. The one or more non-transitory computer-readable media of claim 31 wherein the instructions further comprise instructions that, when executed by one or more computing device, cause: in response to the operation that updates the particular semi-structured document, storing an entry that reflects the update in an in-memory journal associated with the set of second-format data.

33. The one or more non-transitory computer-readable media of claim 19 wherein the second-format is the set-based mirror format and the step of converting the set of first-format data to the second-format comprises merging a hierarchical tree of nodes of each document in the set of semi-structured documents to generate a super hierarchical tree of nodes.

34. The one or more non-transitory computer-readable media of claim 33 wherein the instructions further comprise instructions that, when executed by one or more computing device, cause: generating a compressed bitmap for each node in the super hierarchical tree of nodes, wherein the compressed bitmap for each node indicates which semi-structured documents in the set of semi-structured documents share the node.

35. The one or more non-transitory computer-readable media of claim 19 wherein the instructions further comprise instructions that, when executed by one or more computing device, cause: storing, in volatile memory in conjunction with the set of second-format data, a textual version of documents from the set of semi-structured documents.

36. The one or more non-transitory computer-readable media of claim 35 wherein the instructions further comprise instructions that, when executed by one or more computing device, cause:
- the database server using the set of second-format data to determine which documents satisfy a predicate of a query; and
- the database server generating a result set of the query by extracting values from the textual version of documents that is stored in volatile memory in conjunction with the set of second-format data.

* * * * *

UNITED STATES PATENT AND TRADEMARK OFFICE
CERTIFICATE OF CORRECTION

| | | |
|---|---|---|
| PATENT NO. | : 10,467,243 B2 | Page 1 of 1 |
| APPLICATION NO. | : 15/162235 | |
| DATED | : November 5, 2019 | |
| INVENTOR(S) | : Liu et al. | |

It is certified that error appears in the above-identified patent and that said Letters Patent is hereby corrected as shown below:

On the Title Page

In Column 1, under Assignee, Line 2, delete "Redwood Shore," and insert -- Redwood Shores, --, therefor.

In the Specification

In Column 4, Line 11, delete "2015-OO8883OA1)," and insert -- 2015-0088830A1), --, therefor.

In Column 6, Line 56, delete ""/ZI PCODE/" and insert -- "/ZIPCODE/ --, therefor.

In Column 6, Line 57, delete ""/ZI PCODE"" and insert -- "/ZIPCODE" --, therefor.

In Column 7, Line 46, after "may" insert -- be --.

In Column 20, Line 54, delete "heterogeneous." and insert -- heterogeneous, --, therefor.

Signed and Sealed this
Twenty-third Day of February, 2021

Drew Hirshfeld
*Performing the Functions and Duties of the*
*Under Secretary of Commerce for Intellectual Property and*
*Director of the United States Patent and Trademark Office*